United States Patent [19]

Rothgordt

[11] 4,167,758
[45] Sep. 11, 1979

[54] METHOD AND DEVICE FOR TRANSMITTING FACSIMILE PICTURE SIGNALS

[75] Inventor: Ulf Rothgordt, Norderstedt, Fed. Rep. of Germany

[73] Assignee: U.S. Philips Corporation, New York, N.Y.

[21] Appl. No.: 915,702

[22] Filed: Jun. 15, 1978

Related U.S. Application Data

[63] Continuation of Ser. No. 785,051, Apr. 6, 1977, abandoned.

[30] Foreign Application Priority Data

Apr. 9, 1976 [DE] Fed. Rep. of Germany ....... 2615486

[51] Int. Cl.² .............................................. H04N 7/12
[52] U.S. Cl. ............................. 358/261; 340/347 DD
[58] Field of Search ............... 358/260, 261, 280, 167; 328/111

[56] References Cited

U.S. PATENT DOCUMENTS

| | | | |
|---|---|---|---|
| 3,277,311 | 10/1966 | Merlen | 328/111 |
| 3,287,495 | 11/1966 | Willard | 358/167 |
| 3,394,346 | 7/1968 | Bailey | 358/280 |
| 3,413,412 | 11/1968 | Townsend | 358/280 |
| 4,011,399 | 3/1977 | Tsuchiya | 358/261 |

Primary Examiner—Howard W. Britton
Attorney, Agent, or Firm—Thomas A. Briody; Edward J. Connors, Jr.; James J. Cannon, Jr.

[57] ABSTRACT

With the facsimile transmission of pictures the run-lengths (plurality of successive picture elements of the same luminance value) are often transmitted in coded form to save transmission time and transmission bandwidth respectively. Herein the shortest run-length is often allocated to the shortest code word. In accordance with the invention every run-length having the value 1 is either extended to the value 2 or suppressed and the shortest code word is then allocated in a corresponding manner to the run-length 2. As a result the total length of the transmitted code words for a document is considerably reduced. Extension is done such that one picture element is extended to the left to the detriment of the preceding run-length having the opposite luminance value provided this preceding run-length still contains thereafter at least two picture elements and that in the other case one picture element is extended to the right to the detriment of the next run-length provided the latter retains at least the value 2 and that otherwise the run-length having the value 1 is suppressed. It is true that the resolution is slightly reduced, however only for the very thin lines which is fully acceptable and in many cases hardly noticeable.

4 Claims, 3 Drawing Figures

METHOD AND DEVICE FOR TRANSMITTING FACSIMILE PICTURE SIGNALS

This is a continuation, of application Ser. No. 785,051, filed Apr. 6, 1977, now abandoned.

BACKGROUND OF THE INVENTION

Field of the Invention

The invention relates to a method for transmitting facsimile picture signals obtained from an element-by-element scanning of an original by allocating code numbers to the pluralities of successive elements having the same luminence value (1 run-length), and to a device suitable therefor.

Description of the Prior Art

Such methods for data compression by means of coding are used in facsimile systems to save transmission bandwidth or transmission time and are disclosed, for example, in German Patent Application No. 2440768, which has been laid open to public inspection. Herein a coding method is described which operates with a ternary intermediate coding and which furnishes optimum results for many documents. Depending on the contents of the document to be transmitted, (for example a weather map), other methods are, however, possible which yield still slightly better results, the differences being, however, relatively small. A method which is generally used and which accomplishes a considerable reduction in the transmission bandwidth or transmission time by means of a particularly ingenuous coding only may, consequently, not be expected.

SUMMARY OF THE INVENTION

It is therefore an object of the invention to provide a method with which the signals to be transmitted are so processed prior to coding that in the subsequent coding shorter code words, at least on an average, occur. According to the invention this is realized because each run-length having the value 1 is extended to the run-length having the value 2, or, should this result in a relative shift of the extended run-length by more than one picture element, is suppressed and that when allocating code numbers only the converted run-lengths are taken into account and that at the receiver end the recovered, converted run-lengths are directly released.

In most documents the short run-lengths occur most frequently. A considerable improvement of the data compression can be obtained using this method as the code words for the short run-lengths are still further compressed by the method according to the invention. Namely, in many coding methods the number of bits in the code word exceed for short run-lengths the number of picture elements to be coded, for example, with said coding methods with ternary intermediate coding the run-length 1 is represented by 1.6 bits, the run-length 2 and 3 by 3.2 bits and the run-length 4 by 4.8 bits. In these cases the code word was longer than the run-length itself. By means of the method according to the invention no code word is allocated anymore to the run-length 1, as this run-length is no longer included in the coding action but the run-length 2 is allocated to the shortest code word etc. so that, for example, with ternary intermediate coding all run-lengths having the value $2^n (n=1, 2, 3, \ldots)$ can be represented by 1.6 bits or less. In this manner substantially all code words become shorter than the run-length itself.

The increase in the grain size which is caused by extending a length 1 is acceptable in substantially all cases and is often even hardly noticeable. It was found that a document which, for example, contains a machine-written text and which therefore imposes already-certain requirements on the resolution of the scanning and recording arrangement can be represented, even at an element density of only four elements per mm at the recording side by run-lengths the shortest of which consists for both luminance values of two picture elements. Extending the run-length 1 should not be confused with an increase of the grain size of the total scan to double the value, that is to say to half the scanning density, for the odd run-lengths from the value 3 upward are retained. Furthermore, scanning a line having a width b, if it is located between two scanning points which are spaced from one another at a distance b furnishes already, depending on the setting of the threshold value of the scanning device a run-length 0,1 or 2. So extending the run-length 1 to the value 2 acts to a certain degree as changing the threshold value of the scanning device.

It is known in principle, (German Patent Specification No. 1,169,494, German published Patent Application No. 1,949,343) to extend short signals in the scanning of documents. However, this always refers to a continuous scanning without clock control, the length of the picture signals from a given minimum value being transmitted in analog form and directly. Consequently these methods operate with analog means and a coding of the signals to be transmitted is not provided.

In accordance with an embodiment of the method according to the invention extending the run-length having the value 1 can be performed because each run-length having the value 1 is extended with the last picture element of the preceding run-length having the other luminance value, provided the preceding run-length retains, when converted, at least the value 2 and, otherwise is extended with the first picture element of the next following run-length having the other luminance value provided the following run-length, when converted, retains at least the value 2 and, is completely suppressed. In this manner it is accomplished that extending the run-length having the value 1 to the detriment of a preceding or next run-length takes place only then when these connecting run-lengths retain at least the value 2.

Performing the method according to the invention can be done by a substantially direct conversion of the conditions indicated with the method in a logic switching network in conformity with the rules of the switching algebra. To check whether the preceding and the following run-length retains at least the value 2 a shift register can be provided for both of them.

BRIEF DESCRIPTION OF THE DRAWINGS

An embodiment of the invention will be further explained with reference to the drawing, in which.

DESCRIPTION OF THE PREFERRED EMBODIMENTS

Figures 1, 2:
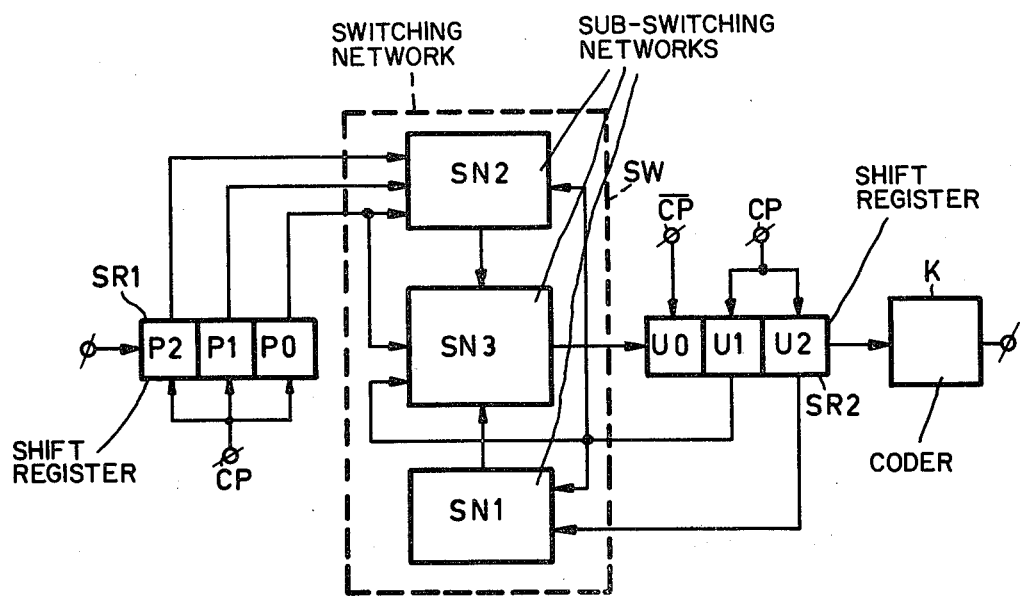
FIG. 1 is a block diagram of a device for performing the method according to the invention.
FIG. 2 shows the succession of logic signals in various points of the block diagram according to FIG. 1 at a variable succession of scanning signals.

The scanned picture signal is applied in FIG. 1 to the first storage element P2 of a shift register SR1. In the embodiment shown here the shift register SR1 comprises only three stages, storage elements P2, P1 and P0 respectively, as only these three stages are necessary for converting the run-length 1. Each time a new picture signal is applied to the storage element P2 the contents of all storage elements are simultaneously transferred one step to the right. The outputs of the storage elements P2, P1 and P0 are connected to inputs of a switching network SW.

The output of the switching network SW leads to the first storage element U0 of a shift register SR2 which, in this example, comprises two further storage elements U1 and U2 which is sufficient for controlling the conversion of the run-length having the value 1. A clock signal CP is applied for controlling the storage elements P2, P1, P0, U1 and U2, whereas the storage element U0 is controlled by an inverse clock signal $\overline{CP}$. The outputs of the second and the third storage element U1 and U2 respectively are also connected to inputs of the switching network SW and the output of the last storage element U2 is connected to a coder K. In the coder K code words are allocated in accordance with one of the prior art methods to the run-lengths supplied by the shift register SR2, which code words are then transferred to the receiver (not shown in the drawing) and reconverted into the run-lengths applied to the coder K at the transmitter side and directly released.

The switching network SW consists of three sub-switching networks SN1, SN2 and SN3 which each consist of logic switching elements. For the various input signals these sub-switching networks supply the output signals indicated in the following table:

TABLE

| | | |
|---|---|---|
| SN1 = L | for | U1 ≠ U2 |
| SN1 = 0 | for | U1 = U2 |
| SN2 = L | for | U1 = P0 = $\overline{P1}$ = P2 |
| SN2 = 0 | for | ... all other cases |
| SN3 = U1 | for | SN1 = L |
| SN3 = $\overline{P0}$ | for | SN1 = 0, SN2 = L |
| SN3 = P0 | for | SN1 = 0, SN2 = 0 |

It should be born in mind that owing to the control with the clock signals CP and $\overline{CP}$ the output of the third sub-switching network SN3 is at the same time the input of the first storage element U0 of the second shift register SR2. The meaning of these signals is further explained herebelow.

If the contents of the storage elements U1 and U2 is different, it is a must that the output signal of the second storage element U1 is supplied to the first storage element U0 of the second shift register SR2, to avoid that the contents of this storage element differs from its neighbour U1 for this would mean that a run-length with the value 1 is supplied to the coder K. This condition is recognized by the sub-switching network SN1 (U1≠U2 results in SN1=L) and the third sub-switching network SN3 is controlled in a corresponding manner (SN1=L results in SN3=U1) as indicated in the table so that the actual value of the next picture element which is stored in the last storage element P0 of the first shift register SR1 is suppressed. This condition has priority to all other conditions for thereafter changing the contents of the shift register SR2 is no longer possible. This results in the fact that any possible run-length with the value 1 is extended to the right to the detriment of the neighbouring next picture element.

The sub-switching network SN2 checks the condition whether the storage element P1 of the first shift register SR1 contains a run-length having the value 1 (P2 and P0 both differ from P1) and whether at least the run-length 2 (P0=U1) precedes this run-length 1. As this condition (U1=P0=$\overline{P1}$=P2 results in SN2=L) only becomes effective when the first sub-switching network SN1 has the output signal 0, so U1=U2, it is therewith established that a run-length of at least 3 precedes the run-length 1 in the storage element P1. So, in this case the run-length 1 may be extended to the left to the detriment of the preceding run-length which is achieved because the third sub-switching network SN3 supplies at its output the inverted output signal of the last storage element P0 of the first shift register SR1 (SN1=0, SN2=L results in SN3=$\overline{P0}$) for with this condition this is just the non-inverted value of the last but one storage element P1.

When neither the first SN1 nor the second sub-switching network SN2 supplies an output signal L (SN1=0, SN2=0) the possibility does not exist that in the second shift register SR2 a run-length 1 is present which must be extended to the right or in the first shift register SR1 a run-length 1 which must be extended to the left, so that consequently the scanned signal which has arived in the last storage element P0 can be directly taken over in the first storage element U0 of the second shift register (SN1=0, SN2=0 results in SN3=P0).

The operation of the switching device of FIG. 1 will be described with reference to the time diagram in FIG. 2 which shows the variation for a randomly scanned signal sample, wherein the black elements in an original to be transmitted are represented in the first line of the diagram by means of crosses. The subsequent lines represent the contents of the storage elements of the first and the second shift register SR1 and SR2. The last lines represent the output signals of the first and the second sub-switching network SN1 and SN2 whereas the output signal of the third sub-switching network SN3 is equal to the contents of the first storage element U0 of the second shift register SR2. The solid crosses below the signal SN2 represent the black elements which correspond to the output signal U2 and which are printed out in a receiver. For comparison the dashed crosses in FIG. 2 represent the black elements of the original to be transmitted, a delay of four elements being present which is produced by the device according to FIG. 1. The digits in FIG. 2 represent a few of the columns.

At the beginning of the scan (at the beginning of a line) the storage elements U1 and U2 are adjusted to a given value (0) which corresponds to the background of the document which is normally white. The contents of the storage elements P0, P1 and P2 directly follow from the scanned signals, wherein, owing to the direction of shift to the right in the shift register SR1 the storage element P0 contains the signal which was scanned first and the other storage elements the corresponding subsequent signals. This means in the diagram of FIG. 2, at the chosen time axis t, that with the three signal rows P0, P1 and P2 a shift upwards to the right takes place and with the three signal rows U0 to U2 a shift each time downwards to the right.

In the column 3 neither of the sub-switching networks SN1 and SN2 furnishes a signal as can be easily checked, so that U0 directly takes over the state of P0, (U0=P0=L). In this respect attention should be paid to the fact that the storage element U0 owing to the use of the inverse block signal $\overline{CP}$ is not written in before the other signals in this column, particularly on the outputs of the sub-switching networks SN1, SN2 and SN3 have assumed the right position.

In column 4 the contents of U1 and U2 are different so that U0 takes over the contents of U1 (=L) so that it is certain no run-length 1 can be produced in the second shift register SR1. However, as the scanned succession of signals indeed contains in this place a run-length exceeding 1 (P0 is also equal to L) the scanned succession of signals is not changed thereby. The same applies for column 6, where the first white signal (U1=0) is automatically extended by another white element (U0=U1), the scanned signal (P0=0) having, however the same value in spite thereof.

A change does not occur until in column 7. From the contents of P0, P1 and P2 it can be deduced that the first shift register SR1 contains a black run-length having the value 1 (O,L,O). At the same time it can be deduced from the corresponding contents (0) of U2, U1 and P0 that this run-length is preceded by a white run-length having the value 3. This causes the sub-switching network SN2 to supply a signal L so that the inverted contents of P0, that is to say the contents of P1=L, is taken over in U0. Herewith this black run-length having the value 1 is completed with an element on the left-hand side, that is to say to the detriment of the preceding white run-length having the value 3. By way of illustration reference is made to the solid and dashed crosses in FIG. 2 at the columns 7 to 10 inclusive. In column 8 the same takes place as in the columns 4 and 6, that is to say the complementary picture element of column 7 is extended by the following picture element which, however, again corresponds to the scanned signal so that again no change occurs.

A following special feature occurs in column 10, which follows a white run-length having the value 1, which in the original signal pattern occurs in column 7. Owing to the deviating contents of U1 and U2 and the signal L obtained thereby at the output of the first sub-switching network SN1 the contents of U1 (=0) is here taken over in U0, although the scanned signal in this place has the opposite value (P0=L). So the white run-length having the value 1 (U1=0 between U2=P0=L) is here completed with one picture element to the right (U0 becomes 0), that is to say to the detriment of a following run-length as the preceding run-length only has the value 2 and, consequently, cannot be shortened, it being irrelevant if this preceding run-length has the values 2 owing to a corresponding, scanned signal or as the result of an extension. Here is shown the advantage of the measure to perform an extension, if possible, first to the detriment of the preceding run-length for in this manner two successive run-lengths having the value 1 and a different signal value can be extended and consequently retained. Extending the white run-length to the right, performed in the column 10 (and recorded in the columns 11 and 12) causes the next black run-length to be shifted to the right, also over one picture element, in the case this run-length should have the value 2 and this also applies for all immediately following run-lengths until a run-length occurs which exceeds 2. In the example of FIG. 2 this is already the next black run-length itself (columns 12, 13 and 14) so that shifting ends at the end of this run-length.

In column 16 a shift to the left of a black run-length having the value 1 occurs again (U0 becomes L), which takes place in the same manner as the shift in the column 7 and which furnishes the crosses at the columns 18 and 19. In like manner the next white run-length having in column 17 P0=L, P1=0, P2=L and U1≠U2, is shifted one place to the right which results on recording in the white run-length in the columns 20 and 21. In column 18, however, a black run-length having the value 1 is present in the scanned signal (P1=L, P0=P2=0). This run-length cannot affect column 19 as extending the preceding white run-length has priority as U1≠U2. An extension to the right is also impossible as then a shift over more than one place would occur so that the scanned signal values P1=L in the column 18 is suppressed in column 19 where U0=U1=0. Also the subsequent white run-length having the value 1 is suppressed namely owing to the fact that thereafter again a black run-length having the value 1 follows. The latter is again extended to the left (crosses at the columns 22 and 23) for then the preceding white run-length in the succession of output signals which reaches as fas as column 19 retains at least the value 2 which, consequently, is still permissible. The subsequent short white run-length is again extended by one place to the right etc. So, in this manner, a scanned succession of signals having successive run-lengths of the value 1 is converted into a succession of signals having successive run-lengths of the value 2 and a corresponding half-rate occurrence of the signal values so that the succession per se is retained albeit, by necessity, with only half the resolution.

Figure 3:
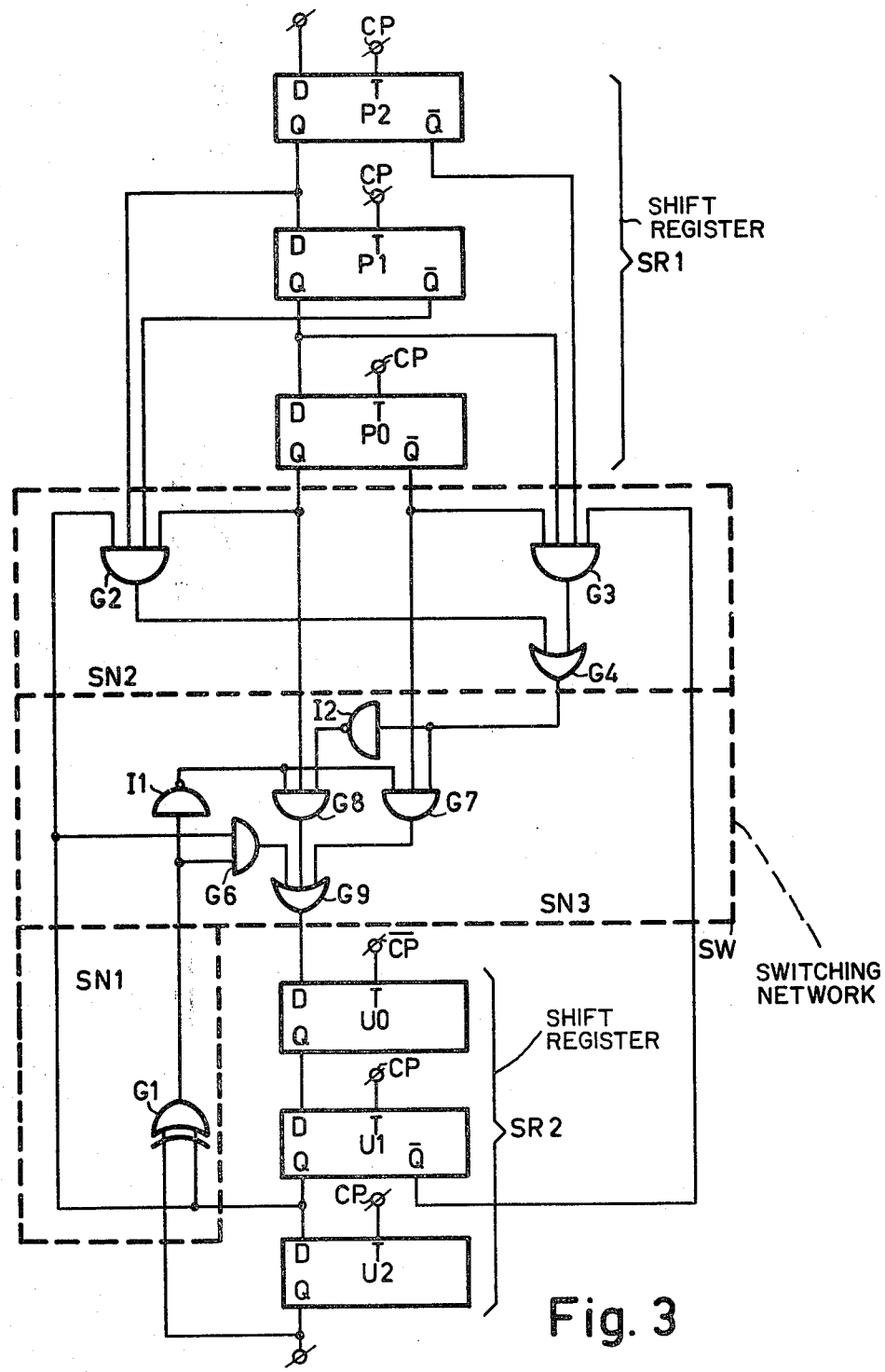
FIG. 3 is an extensive circuit diagram of the block diagram of FIG. 1.

FIG. 3 shows the details of the switching arrangement of FIG. 1. The two shift registers SR1 and SR2 comprise storage elements which are designed as D-flip-flops, which transfer the signal at the input D to the outputs Q and $\overline{Q}$ under the control of a clock signal to be supplied to clock inputs T. Herewith the storage elements P2, P1 and P0 as well as U1 and U2 receive the same clock signal CP, while a delayed and the inverse clock signal $\overline{CP}$ respectively are supplied to storage element U0. The switching network SW is again divided into three sub-switching networks SN1, SN2 and SN3 to obtain a better comparison to the block diagram of FIG. 1. The sub-switching network SN1 should supply a signal L, when the contents of the storage elements U1 and U2 is different. This is accomplished by the exclusive OR-gate G1, which is connected to the output Q of these storage elements. The signal L at the output of the exclusive OR-gate G1 effects that in the sub-switching network SN3 the output Q of the storage element U1 is connected via the AND-gate G6 and the OR gate G9 to the input D of storage element U0, while at the same time the AND gates G8 and G7 and consequently the other input of the OR gate G9 are blocked through the invertor I1.

The sub-switching network SN2 comprises the two AND gates G2 and G3 the inputs of which are each connected to similar outputs of the storage elements P2, P0 and U1 and to the opposite output of the storage element P1. The outputs of these AND-gates are combined in the OR-gate G4 whose output consequently represents the output of the second sub-switching network SN2. When the OR gate G4 supplies a signal L and the exclusive OR-gate G1 simultaneously the signal O the AND gate G7 is released, which gate connects the output $\overline{Q}$ of the storage element P0 to the input D of the storage element U0. When, on the contrary, the two logic switching elements G1 and G4 supply the signal O the AND-gate G8 is released through the invertors I1 and I2 which AND-gate then connects the output Q of the storage element P0 to the input D of the storage element U0. In this manner all conditions for the switching network SW are taken into account.

In conformity with the known rules of the switching algebra the switching network described can be simplified in various manners, depending on the fact whether the maximum number of consecutively connected logic switching elements, the number of switching elements themselves or the inputs thereof should be reduced to a minimum.

What is claimed is:

1. A method for transmitting facsimile picture signals obtained from an element-by-element scanning of an original by allocating code numbers to the pluralities of successive picture elements having the same luminance value, comprising the steps of:
    extending each run-length having the value 1 to the run-length having the value 2;
    suppressing any extended run-length if said extension results in a relative shift of the extended run-length by more than one picture element and allocating code numbers only to the converted run-lengths; and
    directly releasing recovered, converted run-lengths at the receiving end.

2. The method as claimed in claim 1, further comprising the steps of:
    extending each run-length having the value 1 with the last picture element of the preceding run-length having the other luminance value, if the preceding run-length retains, when converted, at least the value 2; and,
    otherwise extending each run-length having the value 1 with the first picture element of the next following run-length having the other luminance value, provided the following run-length, when converted, retains at least the value 2; and,
    otherwise suppressing any extended run-length if the following run-length, when converted, has a value less than 2.

3. A device for facsimile transmission comprising:
    a first shift register having at least three series-connected storage elements for consecutively recording the digitalized luminance values of a scanned picture element, the contents of said first shift register being shifted one storage element upon scanning each new picture element;
    a second shift register having at least three series-connected storage elements, the contents of said second shift register being shifted upon scanning of each new picture element;
    an output of said last storage element of said second shift register;
    a device for allocating code numbers connected to said output of said second shift register;
    a switching network with inputs connected to the outputs of said last three storage elements of said first shift register and to said second and third storage element of said second shift register;
    the input of said first storage element of the second shift register being connected to the output of said switching network;
    the output of said switching network supplying the same signal as the output of said second storage element of said second shift register, if the output signals of the second and the third storage element of the second shift register deviate from one another;
    said switching network supplying the inverted output signal of the last storage element of the first shift register when the output signal of said storage element is equal to that of the last but two storage element of said first shift register and of said second shift register and at the same time deviates from the output signal of the second storage element of the first shift register; and
    said switching network supplying the same signal as the output of the last storage element of said first shift register at all other combinations of the output signals of said storage elements.

4. A device as claimed in claim 3, wherein said switching network comprises:
    first, second and third sub-switching networks, said first sub-switching network being connected to the outputs of said second and third storage element of said second shift register for supplying a first signal when said two storage elements have different output signals;
    said second sub-switching network being connected to said last three storage elements of said first shift register and to said second storage element of said second shift register for supplying a first signal when the output signal of said last storage element but one of said first shift register simultaneously differs from all other connected output signals;
    said third sub-switching network being connected to the outputs of said two first switching networks as well as of said last storage element of said first shift register and of said second storage element of said second shift register and having an output;
    said third sub-switching network supplying the first output signal of said second storage element when said first sub-switching network supplies said first signal;
    supplying the inverted output signal of said last storage element when only said second sub-switching network supplies said first signal; and
    supplying the output signal of said last storage element when neither said first nor said second sub-switching network supplies said first signal.

* * * * *